(12) United States Patent
Nagasawa

(10) Patent No.: US 12,158,529 B2
(45) Date of Patent: Dec. 3, 2024

(54) VEHICLE WITH AUTOMATIC REPORT FUNCTION AND SERVER APPARATUS

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 434 days.

(21) Appl. No.: 17/461,223

(22) Filed: Aug. 30, 2021

(65) Prior Publication Data

US 2022/0066043 A1 Mar. 3, 2022

(30) Foreign Application Priority Data

Aug. 31, 2020 (JP) ................................ 2020-145302

(51) Int. Cl.
*G01S 19/07* (2010.01)
*G01S 5/00* (2006.01)
(Continued)

(52) U.S. Cl.
CPC ............. *G01S 19/17* (2013.01); *G01S 5/011* (2020.05); *H04W 4/44* (2018.02); *H04W 4/90* (2018.02)

(58) Field of Classification Search
CPC .......... G01S 19/17; G01S 5/011; H04W 4/44; H04W 4/90; H04W 4/20; H04W 4/02; B60R 21/00; B60R 2021/0027
(Continued)

(56) References Cited

U.S. PATENT DOCUMENTS

| | | | | |
|---|---|---|---|---|
| 5,392,052 A | * | 2/1995 | Eberwine | G01S 5/0009 342/357.55 |
| 7,567,169 B2 | * | 7/2009 | Dickmann | G08G 1/205 340/436 |

(Continued)

FOREIGN PATENT DOCUMENTS

| | | | | |
|---|---|---|---|---|
| JP | H11-167693 A | | 6/1999 | |
| JP | 2000207688 A | * | 7/2000 | ............... G08G 1/13 |

(Continued)

OTHER PUBLICATIONS

Notice of Reasons for Refusal received in corresponding Japanese Patent Application No. 2020-145302 on May 28, 2024.

*Primary Examiner* — Chuong P Nguyen
(74) *Attorney, Agent, or Firm* — Rimon P.C.

(57) ABSTRACT

A vehicle with an automatic report function includes a transmitter configured to transmit, to a server apparatus for requesting emergency dispatch, emergency information of the vehicle when a collision of the vehicle is detected or forecasted, a global navigation satellite system (GNSS) receiver configured to receive signal waves and generate a location of the vehicle, a storage configured to store the location generated by the GNSS receiver, and a controller configured to collect information from the vehicle and cause the transmitter to transmit the information as the emergency information when the collision of the vehicle is detected or forecasted. When the collision of the vehicle is detected or forecasted, the controller determines whether the location is acquirable from the GNSS receiver and, when the location is not acquirable, collects a previously generated location and causes the transmitter to transmit the previously generated location to the server apparatus.

7 Claims, 8 Drawing Sheets

(51) Int. Cl.
*G01S 19/17* (2010.01)
*H04W 4/44* (2018.01)
*H04W 4/90* (2018.01)

(58) Field of Classification Search
USPC .................................................. 342/357.55
See application file for complete search history.

(56) References Cited

U.S. PATENT DOCUMENTS

| | | | | |
|---|---|---|---|---|
| 8,749,350 | B2* | 6/2014 | Geisler | G07C 5/008 340/8.1 |
| 9,457,754 | B1* | 10/2016 | Christensen | G08G 1/205 |
| 11,482,108 | B2* | 10/2022 | Nagasawa | B60W 30/08 |
| 11,778,445 | B2* | 10/2023 | Nagasawa | H04W 4/90 455/404.1 |
| 11,812,356 | B2* | 11/2023 | Nagasawa | H04W 4/90 |
| 2001/0018636 | A1 | 8/2001 | Mizuno | |
| 2009/0061891 | A1* | 3/2009 | Chung | H04W 4/029 342/357.55 |
| 2009/0138189 | A1 | 5/2009 | Kim et al. | |
| 2010/0070140 | A1* | 3/2010 | Chen | B60R 21/00 701/45 |
| 2022/0279330 | A1* | 9/2022 | Makabe | G08B 25/003 |
| 2023/0021599 | A1* | 1/2023 | Tsuge | H04W 4/44 |
| 2023/0021809 | A1* | 1/2023 | Tsuge | G16H 40/63 |

FOREIGN PATENT DOCUMENTS

| | | | | |
|---|---|---|---|---|
| JP | 2001-091278 | A | | 4/2001 |
| JP | 2001-101579 | A | | 4/2001 |
| JP | 2001126181 | A * | 5/2001 | ............. G08G 1/00 |
| JP | 2003-065780 | A | | 3/2003 |
| JP | 2003289569 | A * | 10/2003 | ............. H04Q 7/34 |

* cited by examiner

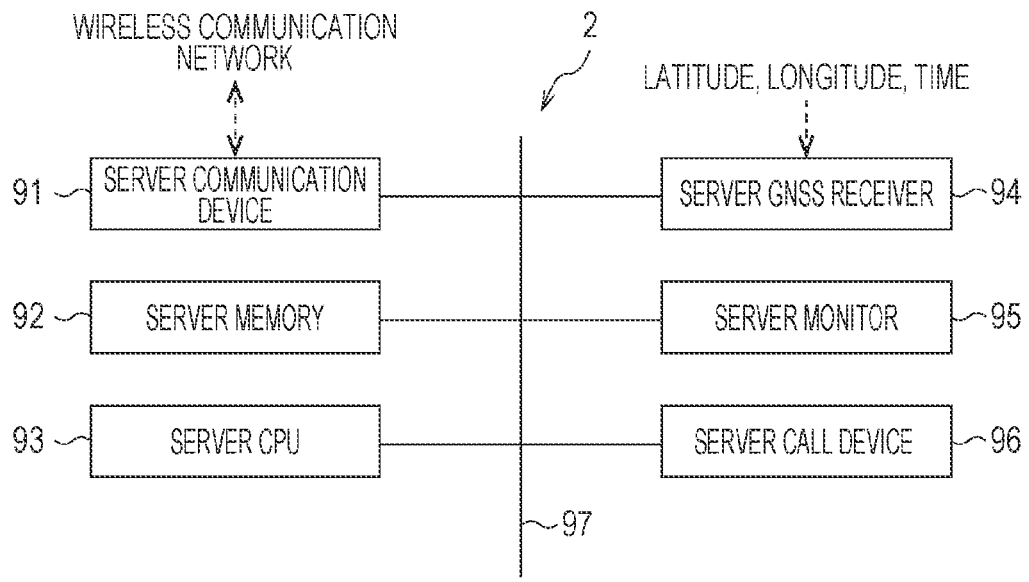
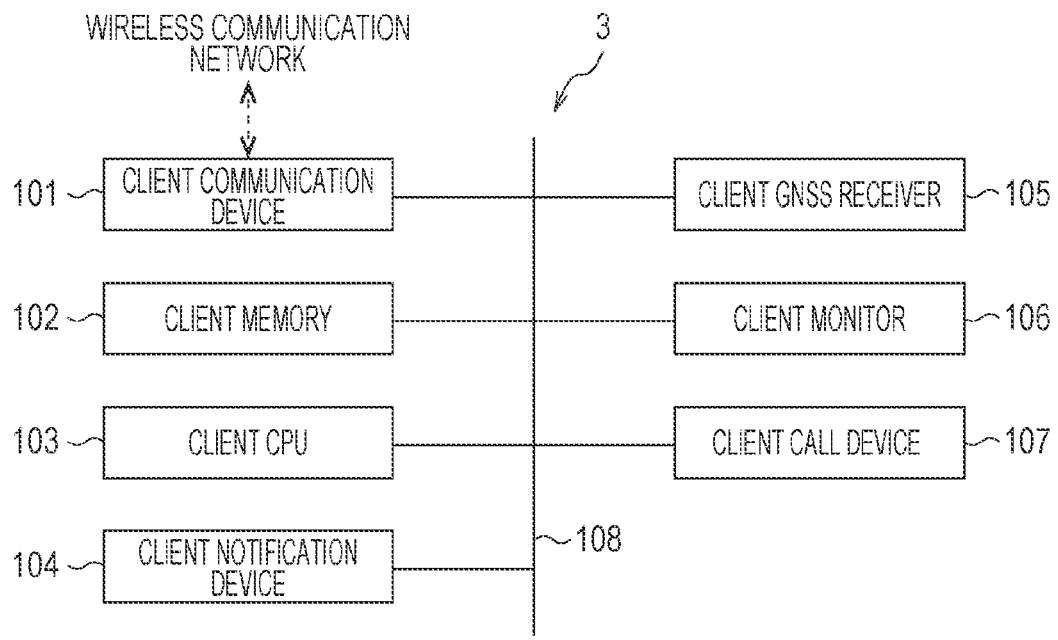

VEHICLE WITH AUTOMATIC REPORT FUNCTION AND SERVER APPARATUS

CROSS-REFERENCE TO RELATED APPLICATIONS

The present application claims priority from Japanese Patent Application No. 2020-145302 filed on Aug. 31, 2020, the entire contents of which are hereby incorporated by reference.

BACKGROUND

The disclosure relates to a vehicle with an automatic report function and a server apparatus.

If an accident occurs for a vehicle such as an automobile, the accident that has occurred may be reported urgently.

For example, an automatic emergency report system such as an advanced automatic collision notification (AACN) system is put into practical use for automobiles. With the AACN system, an automobile involved in an accident transmits accident information to a server apparatus at a call center by using an automatic report apparatus provided in the automobile. The accident information includes an occupant protection state at the time of the accident, the location of the accident site, and the input direction and strength of impact in the accident. At the call center, the server apparatus receives the accident information, and the accident information is checked to request the dispatch of a rescue team with an air ambulance or ambulance. This can shorten a lead time before the air ambulance or ambulance is dispatched. Since the rescue team arrives at the accident site in a short lead time for rescue, the possibility of saving victims of the accident is increased.

In addition, Japanese Unexamined Patent Application Publication No. 2003-065780 discloses a moving object information providing system that transmits location information of a moving object or the like to a server apparatus.

SUMMARY

An aspect of the disclosure provides a vehicle with an automatic report function. The vehicle includes a transmitter, a global navigation satellite system (GNSS) receiver, a storage, and a controller. The transmitter is configured to transmit, to a server apparatus for requesting emergency dispatch, emergency information of the vehicle when a collision of the vehicle is detected or forecasted. The GNSS receiver is configured to receive signal waves and generate a current location of the vehicle. The storage is configured to store, as a previous location, a location of the vehicle. The location is generated by the GNSS receiver. The controller is configured to collect information from the vehicle and cause the transmitter to transmit the information as the emergency information when the collision of the vehicle is detected or forecasted. The controller determines whether the current location is acquirable from the GNSS receiver when the collision of the vehicle is detected or forecasted, and collects the previous location stored in the storage and causes the transmitter to transmit the previous location to the server apparatus in a case where the current location is not acquirable from the GNSS receiver when the collision of the vehicle is detected or forecasted.

An aspect of the disclosure provides a server apparatus. The server apparatus includes a receiver, a display, and a controller. The receiver is configured to receive emergency information of an accident. The emergency information is automatically transmitted in response to a vehicle detecting or forecasting the accident. The display is configured to display the emergency information when the receiver receives the emergency information. The controller is configured to control output of the received emergency information to the display. The controller outputs, to the display, a previous location of the vehicle involved in the accident in a state where the previous location is indicated as being previously generated, when the received emergency information includes the previous location.

An aspect of the disclosure provides a vehicle with an automatic report function. The vehicle includes a transmitter, a global navigation satellite system (GNSS) receiver, a storage, and circuitry. The transmitter is configured to transmit, to a server apparatus for requesting emergency dispatch, emergency information of the vehicle when a collision of the vehicle is detected or forecasted. The GNSS receiver is configured to receive signal waves and generate a current location of the vehicle. The storage is configured to store, as a previous location, a location of the vehicle. The location is generated by the GNSS receiver. The circuitry is configured to collect information from the vehicle and cause the transmitter to transmit the information as the emergency information when the collision of the vehicle is detected or forecasted. The circuitry determines whether the current location is acquirable from the GNSS receiver when the collision of the vehicle is detected or forecasted. The circuitry collects the previous location stored in the storage and causes the transmitter to transmit the previous location to the server apparatus in a case where the current location is not acquirable from the GNSS receiver when the collision of the vehicle is detected or forecasted.

An aspect of the disclosure provides a server apparatus. The server apparatus includes a receiver, a display, and circuitry. The receiver is configured to receive emergency information of an accident. The emergency information is automatically transmitted in response to a vehicle detecting or forecasting the accident. The display is configured to display the emergency information when the receiver receives the emergency information. The circuitry is configured to control output of the received emergency information to the display.

The circuitry is configured to output, to the display, a previous location of the vehicle involved in the accident in a state where the previous location is indicated as being previously generated, when the received emergency information includes the previous location.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to explain the principles of the disclosure.

FIG. 3 is an explanatory diagram of a server apparatus used at a call center in FIG. 1;

FIG. 4 is an explanatory diagram of a client terminal used by a rescue team in FIG. 1;

DETAILED DESCRIPTION

Figure 1:
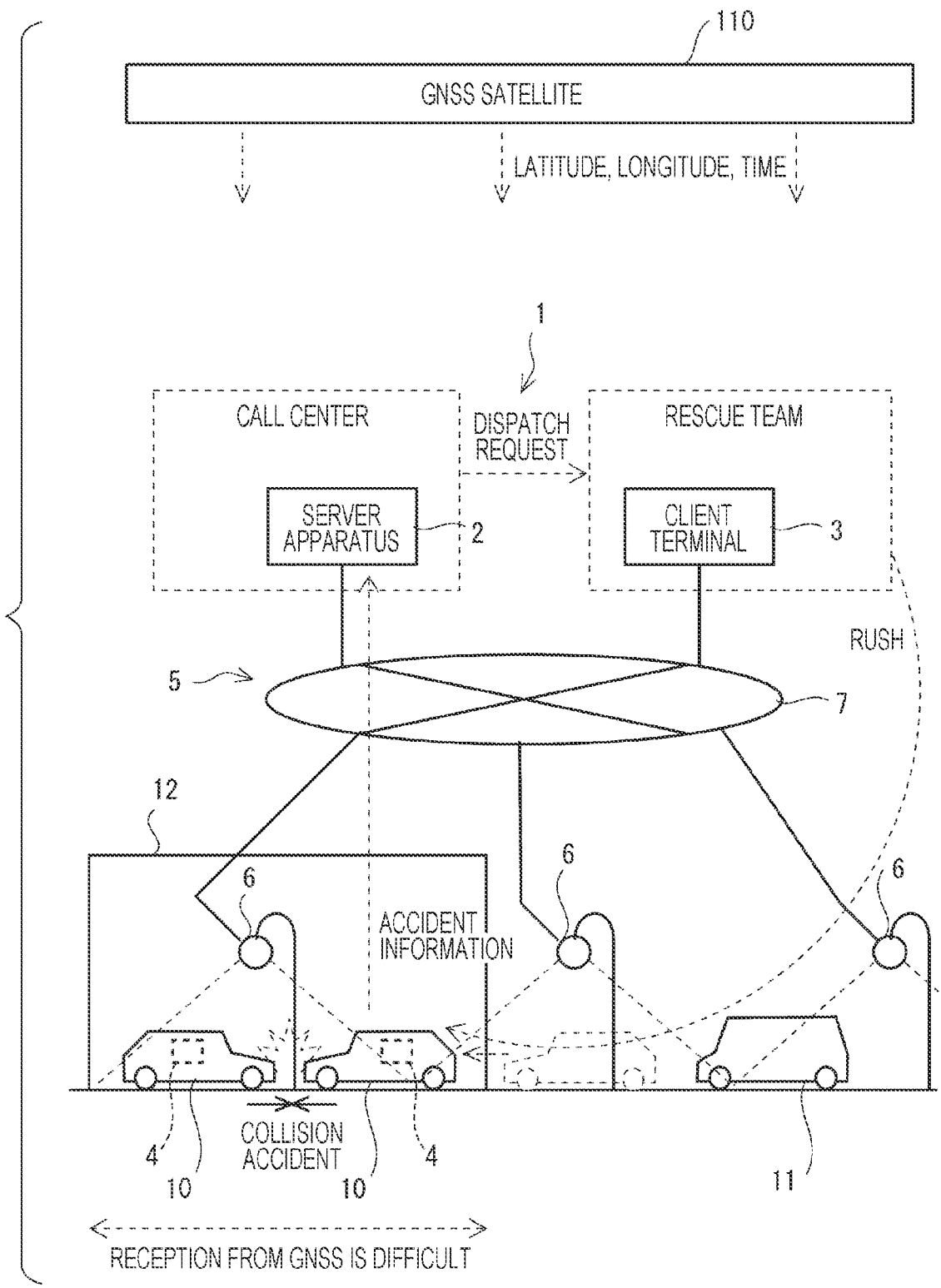
FIG. 1 is an explanatory diagram illustrating an example of an automatic emergency report system according to an embodiment of the disclosure.

A vehicle accident may occur at a place where the above-described automatic emergency report system is unavailable.

For example, a vehicle accident may occur in an environment such as a road in a tunnel, a path through deep woods, a road on the bottom of a deep valley, or a road among high-rise buildings. If a vehicle is involved in an accident in such an environment where radio waves are difficult to receive, it may be difficult for a global navigation satellite system (GNSS) receiver provided in the vehicle to receive signal waves from satellites appropriately. As a result, it may be difficult to generate the current location of the vehicle, that is, the accident site, with high accuracy.

Other than the GNSS receiver, the vehicle may also calculate the track the vehicle has traveled from a previous location by using running information of the vehicle and may use the location based on calculation as the current location of the vehicle. However, such a current location of the vehicle based on calculation may be inaccurate. Accordingly, the vehicle often transfers the location based on calculation to a road by map matching or the like and uses the transferred location as the current location of the vehicle. The transferred current location of the vehicle may be a location, a road, or the like different from an actual location. Even if any processing is performed later, the reliability of the location based on calculation is lower than that of the high-accuracy location obtained by the GNSS receiver.

This is because the result obtained by dead reckoning using integration of vehicle speed information and direction information or the like is a two-dimensional relative location and a difference of altitude is not estimated.

In addition, in a state where the current location of the vehicle is calculated by dead reckoning alone since the high-accuracy current location is not detected by GNSS, if abnormal data is generated in information to be used for dead reckoning, the estimation result may greatly differ from the actual location of the vehicle. An example is a case in which an actual traveling distance is small compared with the rotation of wheels as a result of running with wheelspin on a snowy road or a bad road. Another example is a case in which a two-dimensional relative traveling distance is small compared with the rotation of wheels as a result of running on a steep slope.

If the location based on calculation is set as the location of the accident site where the vehicle is involved in the accident, a rescue team that has rushed thereto may be unable to find the vehicle or occupant involved in the accident and may search the surroundings. If the searching direction is wrong, in an area where the topography or road is complex, the rescue team may be unable to find the accident site immediately. In addition, as a result of search in a wide area, it may take a long time for the rescue team to arrive at the accident site.

In the above manner, it is desirable to provide an automatic emergency report system in which, even if the location of the accident site generated by the vehicle is inaccurate, the rescue team can arrive at the accident site without a great delay.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

FIG. 1 is an explanatory diagram illustrating an example of an automatic emergency report system 1 according to the embodiment of the disclosure.

The automatic emergency report system 1 in FIG. 1 includes a server apparatus 2, a client terminal 3, an automatic report apparatus 4, and a wireless communication network 5. The server apparatus 2 is used at a call center of an organization that manages accidents on roads caused by automobiles 10 and the like. The client terminal 3 is used by a rescue team such as firefighters. The automatic report apparatus 4 is provided in each of the plurality of automobiles 10. The wireless communication network 5 provides a communication line to the server apparatus 2, the client terminal 3, and the automatic report apparatus 4. The wireless communication network 5 includes a plurality of base stations 6 and a communication network 7. The base stations 6 are provided in an area in a dispersed manner along roads, for example, to communicate with a wireless terminal such as the automatic report apparatus 4. The communication network 7 connects the base stations 6. Each of the base stations 6 functions as an access point to which a plurality of wireless terminals in a communicable zone are connected. To the communication network 7 in FIG. 1, the server apparatus 2 at the call center and the client terminal 3 of the rescue team are connected. An example of the above automatic emergency report system 1 used when an accident occurs is an advanced automatic collision notification (AACN) system. In the AACN system, automatic accident information is immediately transmitted from an automobile 10 that is involved in the accident to the server apparatus 2 at the call center, and, in response to a dispatch request from the server apparatus 2 at the call center, a rescue team is dispatched with an ambulance 11 or an air ambulance. The call center can select the rescue team corresponding to the situation of the accident to make a dispatch request. The ambulance 11 or air ambulance can be dispatched for the accident site with the situation of the accident grasped. This can immediately provide victims of the accident with an appropriate lifesaving treatment in a short lead time.

Note that FIG. 1 illustrates an example of the automatic emergency report system 1 used by a plurality of organizations in cooperation. However, the automatic emergency report system 1 may also be used by an organization alone that manages an area including roads on which the automobile 10 and the like can pass. Examples of the organization include the police, a fire department, a government office, a hospital, a medical institution, a security company, and a management company.

FIG. 1 illustrates a global navigation satellite system (GNSS) satellite 110. Each of the apparatuses in FIG. 1 may receive radio waves including location information such as latitude and longitude and time information of a plurality of GNSS satellites 110 so as to obtain the location of the corresponding apparatus and the time. Furthermore, since the plurality of GNSS satellites 110 cooperate with each other, the plurality of apparatuses receiving radio waves therefrom may make the current time and the like match each other with high accuracy. The plurality of apparatuses can use a common time.

Figure 2:
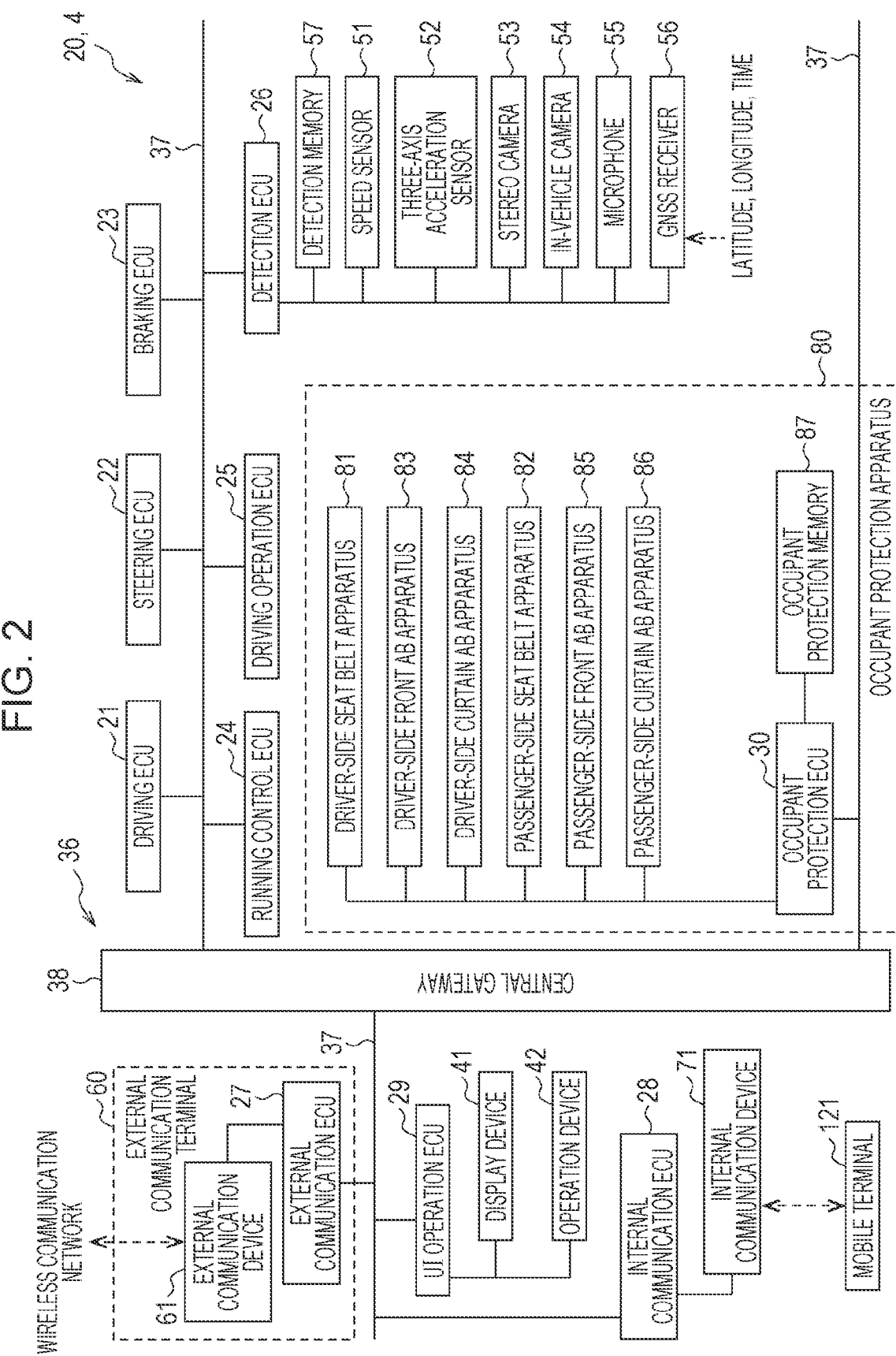
FIG. 2 is an explanatory diagram of a control system of an automobile for which an emergency, such as an accident, may occur in FIG. 1, the control system being capable of serving as an automatic report apparatus.

FIG. 2 is an explanatory diagram of a control system 20 of the automobile 10 for which an emergency, such as an accident, may occur in FIG. 1. The control system 20 is capable of serving as the automatic report apparatus 4.

In the control system 20 of the automobile 10 in FIG. 2, as a representative of each of a plurality of control apparatuses, a control electronic control unit (ECU) that is incorporated in a corresponding one of the control apparatuses is illustrated. In addition to the control ECU, the control apparatus may include, for example, a memory for storing a control program and data, an input/output port coupled to a control object or an apparatus that detects the state thereof, a timer for measuring time, and an internal bus to which the control ECU, the memory, the input/output port, and the timer are coupled.

In one example, the control ECUs illustrated in FIG. 2 are a driving ECU 21, a steering ECU 22, a braking ECU 23, a running control ECU 24, a driving operation ECU 25, a detection ECU 26, an external communication ECU 27, an internal communication ECU 28, a user interface (UI) operation ECU 29, and an occupant protection ECU 30. The control system 20 of the automobile 10 may include another control ECU (not illustrated).

The plurality of control ECUs are connected to a vehicle network 36 such as a controller area network (CAN) or a local interconnect network (LIN) employed in the automobile 10. The vehicle network 36 may include a plurality of bus cables 37 and a central gateway (CGW) 38. The plurality of control ECUs may be coupled via the bus cables 37, and the central gateway 38 serves as a relay apparatus to which the plurality of bus cables 37 are coupled. IDs as identification information different from each other are allocated to the plurality of control ECUs. Basically, a control ECU periodically outputs data to another control ECU. The data includes the ID of a control ECU from which the data is output and the ID of a control ECU to which the data is output. The other control ECU monitors the bus cables 37, and, if, for example, data includes the ID of the other control ECU as the ID of a control ECU to which the data is output, the other control ECU acquires the data and performs processing based on the data. The central gateway 38 monitors each of the plurality of bus cables 37 that are coupled thereto. Upon detection of data that is output from a control ECU coupled to a certain bus cable 37 to a control ECU coupled to another bus cable 37, the central gateway 38 outputs the data to the other bus cable 37. With such relay processing performed by the central gateway 38, data may be input and output between the plurality of control ECUs even if the control ECUs are coupled to different bus cables 37.

To the UI operation ECU 29, for example, a display device and an operation device 42 are coupled as user interface devices for an occupant of the automobile 10. The display device 41 may be, for example, a liquid crystal device or a video projection device. The operation device 42 may be, for example, a touch panel, a keyboard, or a contactless operation detection device. The display device 41 and the operation device 42 may be installed, for example, on an inner surface of a cabin where an occupant boards. The UI operation ECU 29 acquires data from the vehicle network 36 and causes the display device 41 to display the data. The UI operation ECU 29 outputs an operation input on the operation device 42 to the vehicle network 36. The UI operation ECU 29 may further perform processing based on the operation input and may add the processing results to the data. For example, the UI operation ECU 29 may cause the display device 41 to display a navigation screen for setting a destination or the like, may search for a route to the destination selected by an operation input, and may add the route data to the data. The route data may include attribute information such as lanes of roads used for traveling from the current location to the destination.

To the driving operation ECU 25, for example, a steering wheel, a brake pedal, an accelerator pedal, a shift lever, and the like, which are not illustrated, are coupled as operation members for an occupant to control running of the automobile 10. In response to an operation on an operation member, the driving operation ECU 25 outputs data including the presence or absence of an operation, an operation amount, and the like to the vehicle network 36. The driving operation ECU 25 may further perform processing based on the operation on the operation member and may add the processing results to the data. For example, in a situation where another moving object or a fixed object is present in the traveling direction of the automobile 10, in response to an operation on the accelerator pedal, the driving operation ECU 25 may determine the abnormal operation and may add the determination results to the data.

To the detection ECU 26, in addition to a detection memory 57, as detection members for detecting the running state of the automobile 10, for example, a speed sensor 51, a three-axis acceleration sensor 52, a stereo camera 53, an in-vehicle camera 54, a microphone 55, a GNSS receiver 56, and the like are coupled. The speed sensor 51 detects the speed of the automobile 10. The three-axis acceleration sensor 52 detects the acceleration of the automobile 10. The stereo camera 53 captures images of the surroundings of the automobile 10. The in-vehicle camera 54 captures images of an occupant in the cabin. The microphone 55 converts sound inside and outside the vehicle into data. The GNSS receiver 56 locates the automobile 10. The GNSS receiver 56 receives signal waves from the plurality of GNSS satellites 110 and generates the latitude and longitude that are the current location of the automobile 10 and the current time with high accuracy.

The detection memory 57 is a computer-readable storage medium and has a program to be executed by the detection ECU 26, set values, and the like stored therein. Information on details of control performed by the detection ECU 26 may be stored in the detection memory 57. The detection ECU 26 reads the program from the detection memory 57 and executes the program. Thus, the detection ECU 26 controls and manages detection by various detection members of the automobile 10.

For example, the detection ECU 26 acquires detection information from the detection members and outputs data including the detection information to the vehicle network 36. The detection ECU 26 may further perform processing based on the detection information and may add the processing results to the data. For example, if the three-axis acceleration sensor detects an acceleration exceeding a collision detection threshold, the detection ECU 26 may determine that a collision is detected and may add the collision detection results to the data. On the basis of an image captured by the stereo camera 53, the detection ECU 26 may extract an object that is present around the automobile 10, such as a pedestrian, another automobile, a street tree, a utility pole, or a guardrail. The detection ECU 26 may also determine the type or attribute of the object, and, in accordance with the position, size, and change of the object in the image, may estimate the relative direction, relative distance, and moving direction (if the object is moving) of the object. The detection ECU 26 may also add forecast information on a collision with another object including such estimation results to the data and may output the forecast information to the vehicle network 36.

To the external communication ECU 27, an external communication device 61 is coupled. The external communication ECU 27 and the external communication device 61 form an external communication terminal 60 provided for the automobile 10. The external communication device 61 wirelessly communicates with a base station 6 that is near the automobile in the wireless communication network 5. The external communication ECU 27 transmits and receives data to and from the server apparatus 2 via the wireless communication network 5 by wireless communication between the external communication device 61 and the base station 6.

To the internal communication ECU 28, an internal communication device 71 is coupled. The internal communication device 71 performs short-range wireless communication with a mobile terminal 121 of the occupant in the automobile 10. The internal communication ECU 28 transmits and receives data to and from the mobile terminal 121 of the occupant of the automobile 10 by short-range wireless communication between the internal communication device 71 and the mobile terminal 121 of the occupant. Note that, fundamentally, the mobile terminal 121 may be capable of wireless communication with a base station 6 that is nearby in the wireless communication network 5.

The running control ECU 24 controls running of the automobile 10. For example, the running control ECU 24 acquires data from the external communication ECU 27, the detection ECU 26, the driving operation ECU 25, and the like via the vehicle network 36 and autonomously drives the automobile 10 or controls manual driving assistance for running of the automobile 10. The running control ECU 24 generates running control data for controlling running of the automobile 10 on the basis of the acquired data and outputs the running control data to the driving ECU 21, the steering ECU 22, and the braking ECU 23. The driving ECU 21, the steering ECU 22, and the braking ECU 23 control running of the automobile 10 on the basis of the input running control data.

To the occupant protection ECU 30, a plurality of seat belt apparatuses, a plurality of airbag apparatuses, and an occupant protection memory 87 are coupled. The seat belt apparatuses include, for example, a driver-side seat belt apparatus 81 for an occupant who drives the automobile 10 and a passenger-side seat belt apparatus 82 for an occupant who boards the same automobile 10. The airbag apparatuses include, for example, a driver-side front airbag apparatus 83 that is deployed in front of the occupant who drives the automobile 10, a driver-side curtain airbag apparatus 84 that is deployed beside the occupant who drives the automobile 10 and along the inner surface of the automobile 10, a passenger-side front airbag apparatus 85 that is deployed in front of the occupant who boards the same automobile 10, and a passenger-side curtain airbag apparatus 86 that is deployed beside the occupant who boards the same automobile 10 and along the inner surface of the automobile 10. The occupant protection ECU 30, the occupant protection memory 87, the driver-side seat belt apparatus 81, the passenger-side seat belt apparatus 82, the driver-side front airbag apparatus 83, the driver-side curtain airbag apparatus 84, the passenger-side front airbag apparatus 85, and the passenger-side curtain airbag apparatus 86 form an occupant protection apparatus 80.

On the basis of forecast information on a collision with another object or information on collision detection results from the detection ECU 26, the occupant protection ECU 30 activates or controls the seat belt apparatuses or the airbag apparatuses.

The occupant protection memory 87 is a computer-readable storage medium and has a program to be executed by the occupant protection ECU 30, set values, and the like stored therein. Information on details of control performed by the occupant protection ECU 30 may be stored in the occupant protection memory 87. The occupant protection ECU 30 reads the program from the occupant protection memory 87 and executes the program. Thus, the occupant protection ECU 30 may serve as an occupant protection controller of the automobile 10.

For example, the occupant protection ECU 30 as the occupant protection controller performs occupant protection control upon detection or forecast of a collision of the automobile 10 and also performs automatic report processing. In the automatic report processing, the occupant protection ECU collects accident information of the automobile 10 and transmits the collected information as emergency information from the external communication terminal 60 to the server apparatus 2.

FIG. 3 is an explanatory diagram of the server apparatus 2 used at the call center in FIG. 1.

The server apparatus 2 in FIG. 3 includes a server communication device 91, a server memory 92, a server CPU 93, a server GNSS receiver 94, a server monitor 95, a server call device 96, and a server bus 97 to which the server communication device 91, the server memory 92, the server CPU 93, the server GNSS receiver 94, the server monitor 95, and the server call device 96 are coupled.

The server communication device 91 is coupled to the communication network 7 of the wireless communication network 5. The server communication device 91 transmits and receives data to and from other apparatuses, for example, the external communication terminal 60 as a wireless terminal of the automobile 10 and the client terminal 3, via the wireless communication network 5.

The server GNSS receiver 94 receives signal waves from the GNSS satellites 110 to obtain the current time. The server apparatus 2 may include a server timer (not illustrated) to be calibrated by using the current time obtained by the server GNSS receiver 94.

The server monitor 95 displays information of the server apparatus 2. For example, the server monitor 95 displays emergency information received by the server apparatus 2 from the automobile 10 involved in an accident or the like.

The server call device 96 is used by an operator at the call center to talk with a user of the mobile terminal 121 connected by using the server communication device 91.

The server memory 92 is a computer-readable storage medium and has a program to be executed by the server CPU 93, set values, and the like stored therein. Information on details of control performed by the server CPU 93 may be stored in the server memory 92. The server CPU 93 reads the program from the server memory 92 and executes the program. Thus, a server controller is implemented in the server apparatus 2. The server CPU 93 as the server controller manages an overall operation of the server apparatus 2.

Upon the server communication device 91 receiving the emergency information of the accident, the emergency information being automatically transmitted in response to the automobile 10 detecting or forecasting an accident, the server CPU 93 outputs the received emergency information to the server monitor 95 and causes the server monitor 95 to display the emergency information. Thus, the server CPU 93 can control output of the received emergency information to the server monitor 95 as a display.

FIG. 4 is an explanatory diagram of the client terminal 3 used by the rescue team in FIG. 1.

The client terminal 3 in FIG. 4 includes a client communication device 101, a client memory 102, a client CPU 103, a client notification device 104, a client GNSS receiver 105, a client monitor 106, a client call device 107, and a client bus 108 to which the client communication device 101, the client memory 102, the client CPU 103, the client notification device 104, the client GNSS receiver 105, the client monitor 106, and the client call device 107 are coupled.

The client communication device 101 is coupled to the communication network 7 of the wireless communication network 5. The client communication device 101 transmits and receives data to and from other apparatuses, for example, the external communication device 61 as a wireless terminal of the automobile 10 and the server apparatus 2, via the wireless communication network 5.

The client GNSS receiver 105 receives signal waves from the GNSS satellites 110 to obtain the current time. The client terminal 3 may include a server timer (not illustrated) to be calibrated by using the current time obtained by the client GNSS receiver 105.

The client monitor 106 displays information of the client terminal 3. For example, the client monitor 106 displays a dispatch request or the like received from the server apparatus 2.

The client notification device 104 outputs a dispatch request sound to members of the rescue team.

The client call device 107 is used by a member of the rescue team to talk with a user of the mobile terminal 121 connected by using the client communication device 101.

The client memory 102 is a computer-readable storage medium and has a program to be executed by the client CPU 103, set values, and the like stored therein. Information on details of control performed by the client CPU 103 may be stored in the client memory 102. The client CPU 103 reads the program from the client memory 102 and executes the program. Thus, a client controller is implemented in the client terminal 3. The client CPU 103 as the client controller manages an overall operation of the client terminal 3.

Figure 5:
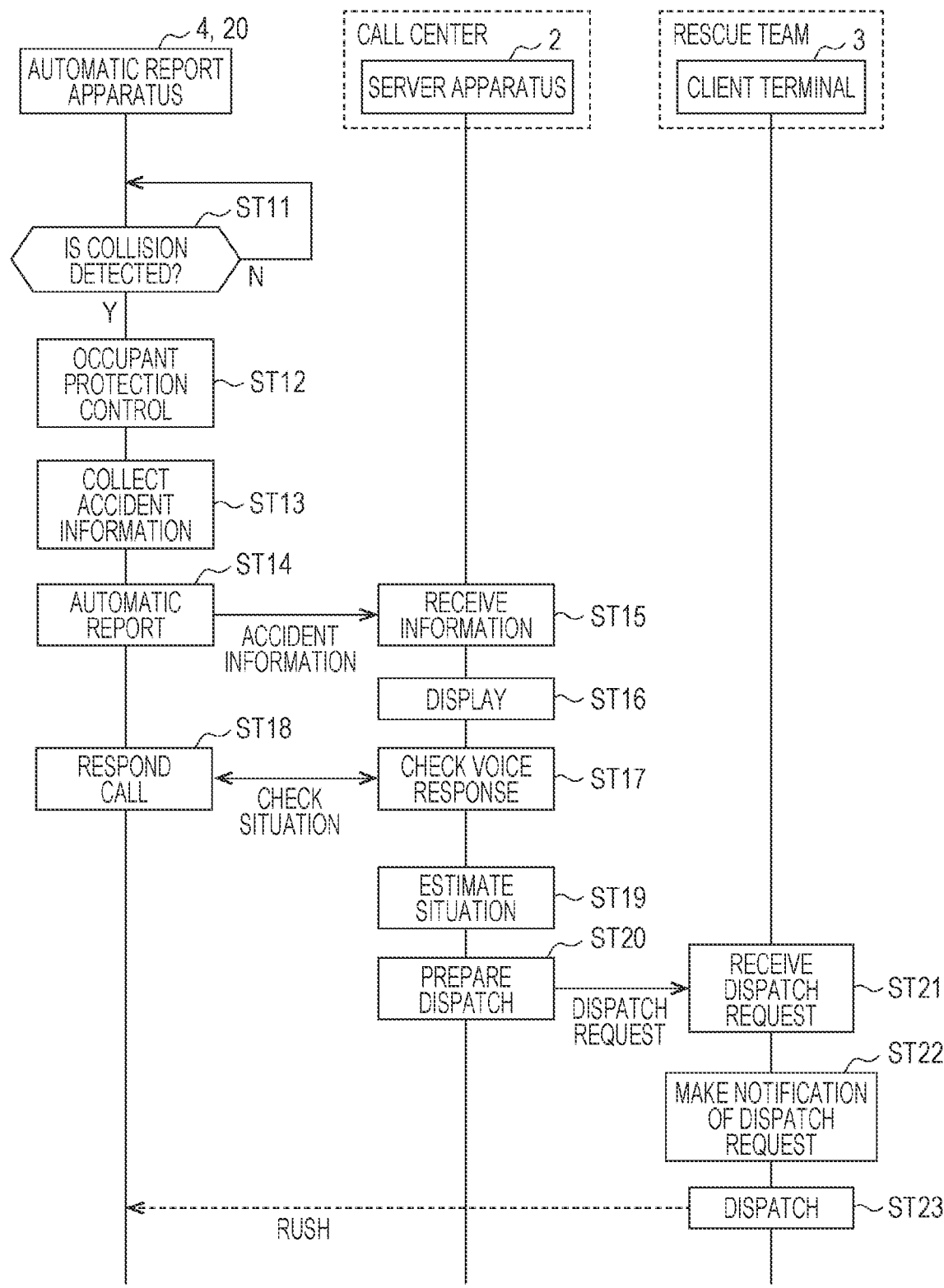
FIG. 5 is a sequence chart illustrating an example of a process flow of the automatic emergency report system in FIG. 1 from when the automobile involved in an accident transmits an automatic emergency report to the server apparatus to when the rescue team is dispatched to an accident site.

FIG. 5 is a sequence chart illustrating an example of a process flow of the automatic emergency report system 1 in FIG. 1 from when the automobile 10 involved in an accident transmits an automatic emergency report to the server apparatus 2 to when the rescue team is dispatched to an accident site.

FIG. 5 illustrates the control system 20 as the automatic report apparatus 4 of the automobile 10, the server apparatus 2 at the call center, and the client terminal 3 of the rescue team. Time flows from top to bottom.

In step ST11, the detection ECU 26 of the automobile 10 detects a collision of the automobile 10. For example, the detection ECU 26 detects a collision if the acceleration detected by the three-axis acceleration sensor 52 is greater than a predetermined threshold. If no collision is detected, the detection ECU 26 repeats the processing in step ST11. Upon the collision being detected, the detection ECU 26 transmits collision detection information to the occupant protection ECU 30 and advances the processing to step ST12. Note that the detection ECU 26 may end the processing if no collision is detected after a lapse of a certain period of time from the start of the processing.

Note that the detection ECU 26 may forecast that a collision is unavoidable before detecting the collision. In addition, on the basis of the forecast that the collision is unavoidable, the occupant protection ECU 30 may perform preliminary control for occupant protection before detecting the collision. As the preliminary control, the occupant protection ECU 30 may, for example, wind up surplus of a seat belt of a seat belt apparatus to set a pre-tension state or perform other processing. For example, the occupant protection ECU 30 may pre-deploy an airbag apparatus.

In step ST12, the occupant protection ECU 30 of the automobile 10 that has detected the collision performs occupant protection control on the basis of the collision detection information. The occupant protection ECU 30 selects and activates a seat belt apparatus and an airbag apparatus. Thus, the seated occupant is constrained in the seat, or, even if the occupant falls from the seat, the airbag can absorb the impact.

In this embodiment, the occupant protection ECU 30 performs the occupant protection control after the collision has been detected in step ST11. However, the occupant protection ECU 30 may alternatively perform the occupant protection control at the stage of the collision forecast before the collision detection.

In step ST13, the occupant protection ECU 30 of the automobile 10 that has performed the occupant protection control collects accident information. The accident information may basically be information collected by the AACN system described above. The AACN system collects the accident information such as an operation state and the location of the occupant protection apparatus 80 at the time of the accident and the input direction and strength of the impact in the accident.

In step ST14, the external communication ECU 27 of the automobile 10 transmits an automatic report. By using the external communication device 61 as a transmission apparatus that can communicate with the server apparatus 2, upon detection of the accident of the automobile 10, the external communication ECU 27 transmits the collected information as the automatic report to the server apparatus 2. As a communication apparatus of the automobile 10, the external communication device 61 transmits emergency information for an emergency such as an accident of the automobile 10 to the server apparatus 2 for requesting emergency dispatch.

In step ST15, the server communication device 91 of the server apparatus 2 at the call center receives the information of the automatic report from the automobile 10 involved in the accident. The information of the automatic report received by the server communication device 91 may be stored in the server memory 92.

In step ST16, the server CPU 93 of the server apparatus 2 at the call center causes the server monitor 95 to display the information of the automatic report received by the server communication device 91. On the basis of the accident information displayed on the server monitor 95, an operator at the call center can check the situation of the accident of the automobile 10.

In step ST17, the server CPU 93 of the server apparatus 2 at the call center communicates with the external communication ECU 27 of the automobile 10 involved in the accident. In step ST18, the occupant protection ECU 30 of the automobile 10 responds a voice call. Thus, a call line through which a call is possible is established between the server call device 96 and, for example, the microphone 55 of the automobile 10. The operator at the call center checks the safety and health state of the occupant from the voice. This makes it possible to directly check the state such as the degree of the injury of the occupant of the automobile 10 involved in the accident. The operator at the call center may input the check results to the server apparatus 2.

In step ST19, the server CPU 93 of the server apparatus 2 at the call center estimates the situation. The server CPU 93 may estimate the situation on the basis of the information of the automatic report received by the server communication device 91 and the information input by the operator at the call center. The server CPU 93 may collate with previous accident information and may estimate the situation by artificial intelligence processing. The operator at the call center may alternatively estimate the situation by comprehensively considering the situation and may input the estimation results to the server apparatus 2.

In step ST20, the server CPU 93 of the server apparatus 2 at the call center prepares the dispatch. The server CPU 93 transmits a dispatch request to the client terminal 3 of the rescue team by using the server communication device 91. The server CPU 93 may transmit the dispatch request in response to an operation performed by the operator at the call center.

In step ST21, the client communication device 101 of the client terminal 3 of the rescue team receives the dispatch request from the server apparatus 2. The dispatch request received by the client communication device 101 may be stored in the client memory 102.

In step ST22, the client CPU 103 of the client terminal 3 of the rescue team makes a notification of the dispatch request. Upon the client communication device 101 receiving the dispatch request, the client CPU 103 causes the client notification device 104 to output a dispatch request sound. The client CPU 103 may also cause the client monitor 106 to display a dispatch request screen. The dispatch request screen may display the information of the automatic report and the information input by the operator at the call center.

In step ST23, members of the rescue team are dispatched. The members of the rescue team can grasp that the dispatch request is made for the team from the dispatch request sound and the dispatch request screen and can be dispatched urgently with the ambulance 11 or air ambulance.

Thus, on the basis of the accident information automatically reported from the automobile 10 involved in the accident, the rescue team can be dispatched with the ambulance 11 or air ambulance in a minimum lead time without delay. The rescue team can be dispatched with the ambulance 11 or air ambulance urgently in the appropriately prepared state on the basis of the accident information acquired in advance. Since the rescue team arrives at the accident site in a short lead time for rescue, the possibility of saving victims of the accident is increased.

However, an accident of the automobile 10 may occur at a place where the above-described automatic emergency report system is unavailable. For example, an accident of the automobile 10 may occur in an environment such as a road in a tunnel, a path through deep woods, a road on the bottom of a deep valley, or a road among high-rise buildings.

If the automobile 10 is involved in an accident in such an environment where radio waves are difficult to receive, it may be difficult for the GNSS receiver 56 provided in the automobile 10 to receive signal waves from satellites appropriately. As a result, it may be difficult to generate the current location of the automobile 10, that is, the accident site, with high accuracy.

Other than the GNSS receiver 56, the automobile 10 may also calculate the track the automobile 10 has traveled from a previous location by using running information of the automobile 10 and may use the location based on calculation as the current location of the automobile 10. However, such a current location of the automobile 10 based on calculation may be inaccurate. Accordingly, the automobile 10 often transfers the location based on calculation to a road by map matching or the like and uses the transferred location as the current location of the automobile 10. The transferred current location of the automobile 10 may be a location, a road, or the like different from an actual location. Even if any processing is performed later, the reliability of the location based on calculation is lower than that of the high-accuracy location obtained by the GNSS receiver 56.

This is because the result obtained by dead reckoning using integration of vehicle speed information and direction information or the like is a two-dimensional relative location and a difference of altitude is not estimated.

In addition, in a state where the current location of the automobile 10 is calculated by dead reckoning alone since the high-accuracy current location is not detected by GNSS, if abnormal data is generated in information to be used for dead reckoning, the estimation result may greatly differ from the actual location of the automobile 10. An example is a case in which an actual traveling distance is small compared with the rotation of wheels as a result of running with wheelspin on a snowy road or a bad road. Another example is a case in which a two-dimensional relative traveling distance is small compared with the rotation of wheels as a result of running on a steep slope.

In the map matching by dead reckoning, because of a plurality of candidates present in the vertical direction, output of the map matching result may be wrong in the vertical direction.

In addition, because of the difference between the rotation of wheels and the actual traveling distance, the estimated location on a two-dimensional plane may shift.

If such a low-accuracy location based on calculation is set as the location of the accident site where the automobile 10 is involved in the accident, a rescue team that has rushed thereto may be unable to find the automobile 10 or occupant involved in the accident and may search the surroundings. If the searching direction is wrong, in an area where the topography or road is complex, the rescue team may be unable to find the accident site immediately. In addition, as a result of search in a wide area, it may take a long time for the rescue team to arrive at the accident site.

In the above manner, it is desirable to provide an automatic emergency report system in which, even if, in some rare cases, the accuracy of the location of the accident site generated by the automobile 10 is greatly low on the basis of the estimation result by dead reckoning, the rescue team can arrive at the accident site without a great delay.

Figure 6:
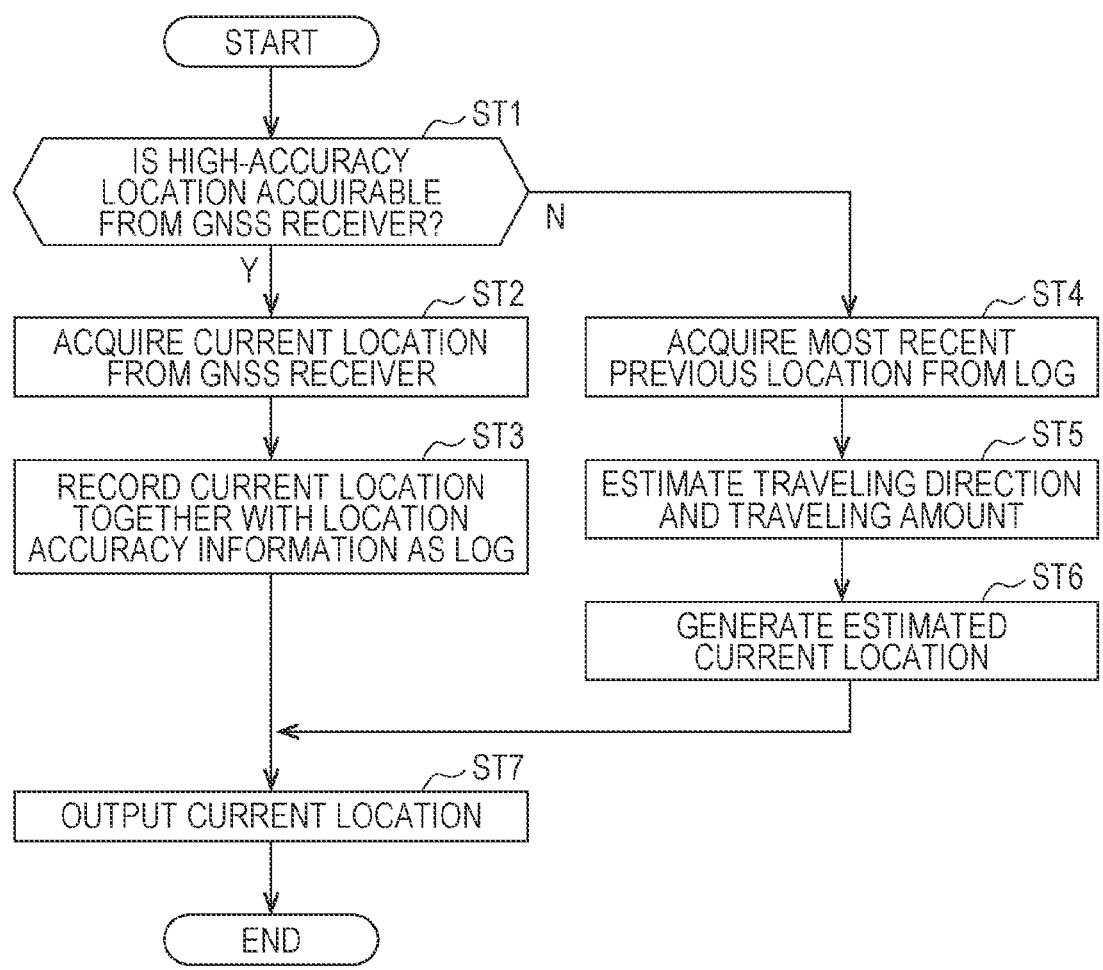
FIG. 6 is a flowchart illustrating a process flow in which the control system of the automobile in FIG. 2 generates or estimates a current location of the automobile.

FIG. 6 is a flowchart illustrating a process flow in which the control system 20 of the automobile 10 in FIG. 2 generates or estimates a current location of the automobile 10.

The control system 20 of the automobile 10 in FIG. 2 repeatedly performs the processing in FIG. 6 to generate the current location of the automobile 10 based on the GNSS receiver 56. If a high-accuracy current location is not acquirable from the GNSS receiver 56, by the processing in FIG. 6, the detection ECU 26 calculates a traveling direction and a traveling amount of the automobile 10, which are the track from a previous location, by using running information of the automobile 10, and estimates the location based on calculation as the current location of the automobile 10. Another control ECU of the automobile 10, for example, the running control ECU 24, may control running of the automobile 10 by using the current location acquired from the detection ECU 26. In addition, the UI operation ECU 29 may cause a navigation screen to display the current location acquired from the detection ECU as the current location. Thus, control ECUs such as the running control ECU 24 and the UI operation ECU 29 can continue control that has been previously performed even if, for example, the GNSS receiver 56 is incapable of receiving signal waves or generating a high-accuracy current location.

Note that all or part of the processing for generating or estimating the current location of the automobile 10 in FIG. 6 may be performed by other control ECUs provided in the control system 20 of the automobile 10 in FIG. 2, such as the occupant protection ECU 30, the running control ECU 24, and the driving operation ECU 25.

In step ST1, the detection ECU 26 determines whether a high-accuracy current location is acquirable from the GNSS receiver 56. In a case of malfunction or being incapable of receiving predetermined signal waves from the GNSS satellites 110 or the like, the GNSS receiver 56 is incapable of generating high-accuracy current location and time. In such a case, the detection ECU 26 determines that a high-accuracy current location is not acquirable from the GNSS receiver 56 and advances the processing to step ST4. If a high-accuracy current location is acquirable from the GNSS receiver 56, the detection ECU 26 advances the processing to step ST2.

In step ST2, the detection ECU 26 acquires the current location of the automobile 10 from the GNSS receiver 56.

In step ST3, the detection ECU 26 stores, in the detection memory 57, the acquired current location of the automobile 10 in an accumulated manner together with location accuracy information determined by the GNSS receiver 56. The location accuracy information may indicate, for example, an error range of the generated location by a radius of the range. Thus, high-accuracy previous locations and times generated by the GNSS receiver 56 are stored as log data in an accumulated manner in the detection memory 57. Together with the high-accuracy previous locations and times generated by the GNSS receiver 56, accuracy information for each of the locations and times is stored as log data in an accumulated manner in the detection memory 57.

In step ST4, the detection ECU 26 acquires, from the detection memory 57, a location previously generated by the GNSS receiver 56. From among the plurality of previous locations stored as log data in an accumulated manner in the detection memory 57, the detection ECU 26 may acquire a most recent one or a most recent one with the location accuracy information being lower than a predetermined level.

In step ST5, by using information from various sensors other than the GNSS receiver 56, the detection ECU 26 estimates the track the automobile 10 has traveled from the acquired previous location up to the current time. For example, the track the automobile 10 has traveled may consist of a traveling direction and a traveling amount. For example, the detection ECU 26 can obtain the traveling direction and the traveling amount from the previous location by obtaining a double integral of accelerations detected by the three-axis acceleration sensor 52 at and after the time corresponding to the acquired previous location. Alternatively, for example, the detection ECU 26 may obtain the traveling direction and the traveling amount from the previous location on the basis of information of a gyro sensor provided in the automobile 10, data of actual running control performed by the running control ECU 24, and running data for navigation of the UI operation ECU 29.

In step ST6, the detection ECU 26 generates an estimated current location. The detection ECU 26 may generate the current location by calculation of adding the estimated traveling direction and traveling amount to the acquired previous location. Thus, on the basis of the high-accuracy previous location and time that are generated by the GNSS receiver 56 for the last time, the detection ECU 26 can estimate the current location and time of the automobile 10. Alternatively, for example, the detection ECU 26 may estimate the current location and time of the automobile 10 on the basis of information of a gyro sensor provided in the automobile 10, data of actual running control performed by the running control ECU 24, and running data for navigation of the UI operation ECU 29.

In step ST7, the detection ECU 26 outputs the current location acquired from the GNSS receiver 56 or the estimated current location.

In the above manner, regardless of whether the GNSS receiver 56 can generate a high-accuracy current location and time, the detection ECU 26 can generate the current location and time of the automobile 10 that are usable by units of the automobile 10.

However, even if the GNSS receiver 56 is incapable of generating a high-accuracy current location and time, the detection ECU 26 generates the current location and time of the automobile 10 that are usable by units of the automobile 10 as described above, the automobile 10 may transmit, in an automatic emergency report of an accident to the server apparatus 2, low-accuracy and uncertain current location and time that are different from actual location and time.

Figure 7:
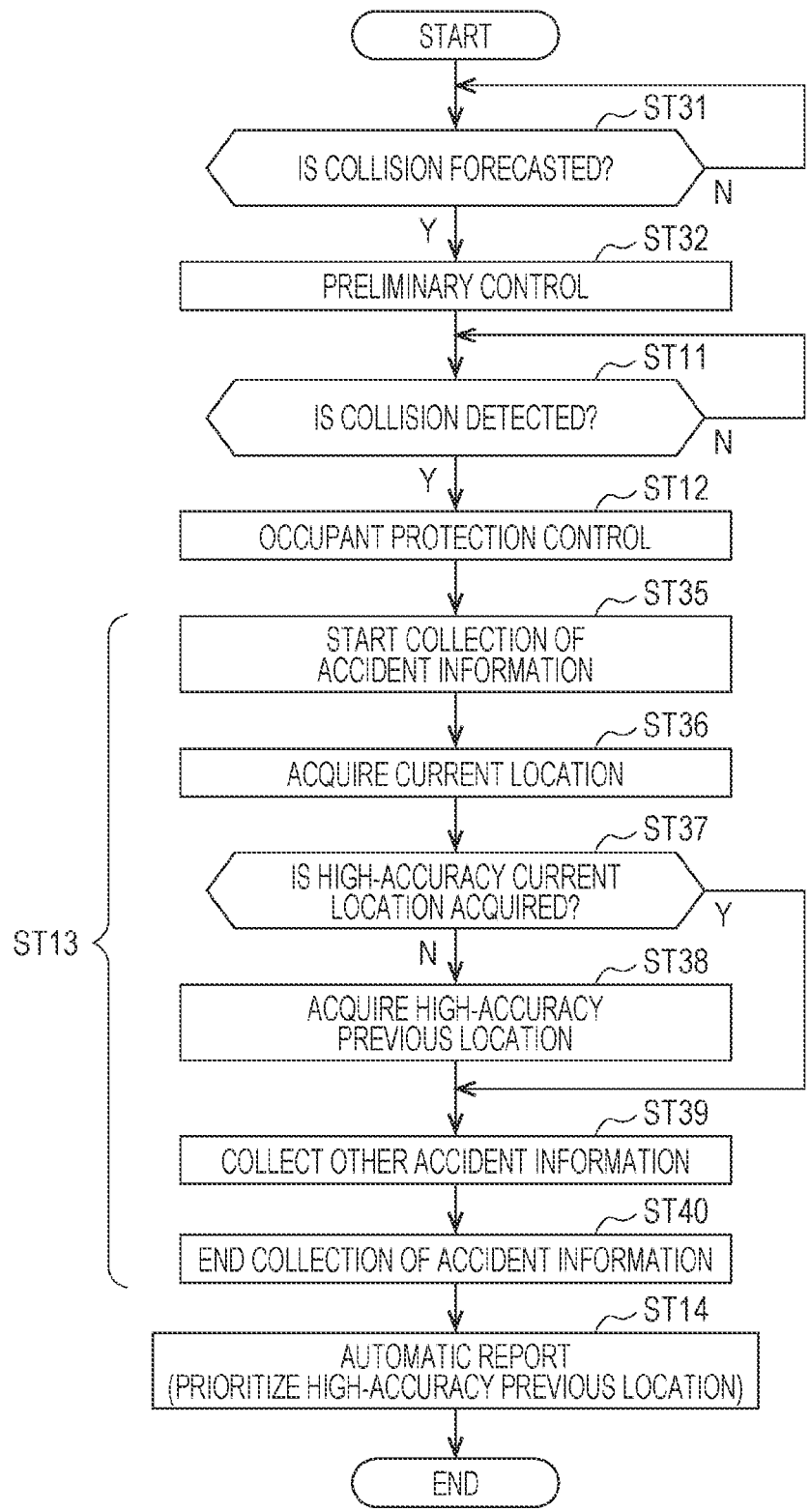
FIG. 7 is a sequence chart illustrating a process flow that is performed in response to the control system of the automobile in FIG. 2 forecasting and detecting an accident of the automobile.

FIG. 7 is a sequence chart illustrating a process flow that is performed in response to the control system 20 of the automobile 10 in FIG. 2 forecasting and detecting an accident of the automobile 10.

The control system 20 of the automobile 10 in FIG. 2 repeatedly performs the processing in FIG. 7.

Note that all or part of the processing in FIG. 7 may be performed by the detection ECU 26, the occupant protection ECU 30, or other control ECUs provided in the control system 20 of the automobile 10 in FIG. 2, such as the running control ECU 24, the driving operation ECU 25, and the external communication ECU 27.

In step ST31, the detection ECU 26 forecasts a collision. For example, the detection ECU 26 may forecast a collision by determining whether another moving object approaching the automobile 10 is present on the basis of an image captured by the stereo camera 53. If no collision is forecasted, the detection ECU 26 repeats the processing in step ST31. Upon the collision being forecasted, the detection ECU 26 transmits forecast information to the occupant protection ECU 30 and advances the processing to step ST32.

In step ST32, the occupant protection ECU 30 performs preliminary control for occupant protection on the basis of the forecast information. The occupant protection ECU 30 selects a seat belt apparatus and an airbag apparatus to be activated. The occupant protection ECU 30 may select a seat belt apparatus for the seat in which an occupant is seated and an airbag apparatus to be deployed in the direction in which the upper body of the occupant will fall due to the collision. The occupant protection ECU 30 winds up surplus of the seat belt of the selected seat belt apparatus to set a pretension state. On the basis of the input direction and strength of the forecasted collision, the occupant protection ECU 30 selects the airbag apparatus that can be deployed in the direction in which the upper body of the occupant will fall due to the collision.

In step ST11, the detection ECU 26 detects the collision. For example, the detection ECU 26 detects the collision if the acceleration detected by the three-axis acceleration sensor 52 is greater than a predetermined threshold. If no collision is detected, the detection ECU 26 repeats the processing in step ST11. Upon detection of the collision, the detection ECU 26 transmits detection information to the occupant protection ECU 30 and advances the processing to step ST12. Note that the detection ECU 26 may end the processing if no collision is detected while the processing is repeated.

In step ST12, the occupant protection ECU 30 performs occupant protection control on the basis of the detection information. The occupant protection ECU 30 activates the selected seat belt apparatus and airbag apparatus. Thus, the seated occupant is constrained in the seat, or, even if the occupant falls from the seat, the airbag can absorb the impact.

In step ST35, as the processing in step ST13, the occupant protection ECU 30 starts to collect accident information from units of the automobile 10. For example, the occupant protection ECU 30 collects at least information on the acceleration and direction of the collision at the time of the accident detected by the three-axis acceleration sensor 52, the current location indicating the accident site and the time, and activation information of the seat belt apparatus and airbag apparatus.

In step ST36, the occupant protection ECU 30 acquires the current location indicating the accident site and the time from the detection ECU 26.

In step ST37, the occupant protection ECU 30 determines whether the current location and the time acquired in step ST36 are high-accuracy current location and time generated by the GNSS receiver 56 in response to reception of predetermined signal waves. Thus, when detecting or forecasting a collision of the automobile 10, the occupant protection ECU 30 can determine whether the high-accuracy current location and time are acquirable from the GNSS receiver 56.

In step ST38, the occupant protection ECU 30 acquires, from the detection memory 57, high-accuracy previous location and time that are previously generated by the GNSS receiver 56 in response to reception of predetermined signal waves. Thus, from among the plurality of previous locations and times stored in the detection memory 57 as a storage, the occupant protection ECU 30 can select and collect the most recent location that satisfy a predetermined location accuracy and the time.

In step ST39, the occupant protection ECU 30 collects accident information other than the current location and time from units of the automobile 10.

In step ST40, the occupant protection ECU 30 ends the processing of collecting the accident information from units of the automobile 10. The occupant protection ECU 30 ends the processing in step ST13.

In step ST14, the external communication ECU 27 automatically transmits the accident emergency information as an automatic report to the server apparatus 2 by using the external communication device 61. The emergency information transmitted to the server apparatus 2 includes the current location and time indicating the location of the accident site. However, if the current location and time acquired in step ST36 are not the high-accuracy current location and time generated by the GNSS receiver 56 in response to reception of predetermined signal waves, in place of or in addition to the current location and time, the emergency information includes the high-accuracy previous location and time that are previously generated by the GNSS receiver 56 in response to reception of predetermined signal waves and that are acquired in step ST38.

Thus, when detecting or forecasting a collision of the automobile 10, if the high-accuracy current location and time are not acquirable from the GNSS receiver 56, that is, if the current location and time of the automobile 10 estimated by the detection ECU 26 are acquired, further, the occupant protection ECU 30 can collect high-accuracy previous location and time that are previously generated by the GNSS receiver 56 and that are stored in the detection memory 57 and can cause the external communication terminal 60 as a transmitter to transmit the high-accuracy previous location and time to the server apparatus 2. If the collision of the automobile 10 is detected or forecasted and, further, if the transmitter can transmit the emergency information to the server apparatus 2, the occupant protection ECU 30 can collect the high-accuracy previous location and time that are generated by the GNSS receiver 56 and that are stored in the detection memory 57 preferentially over the current location and time of the automobile 10 estimated by the detection ECU 26, and can cause the transmitter to transmit the high-accuracy previous location and time to the server apparatus 2.

Figure 8:
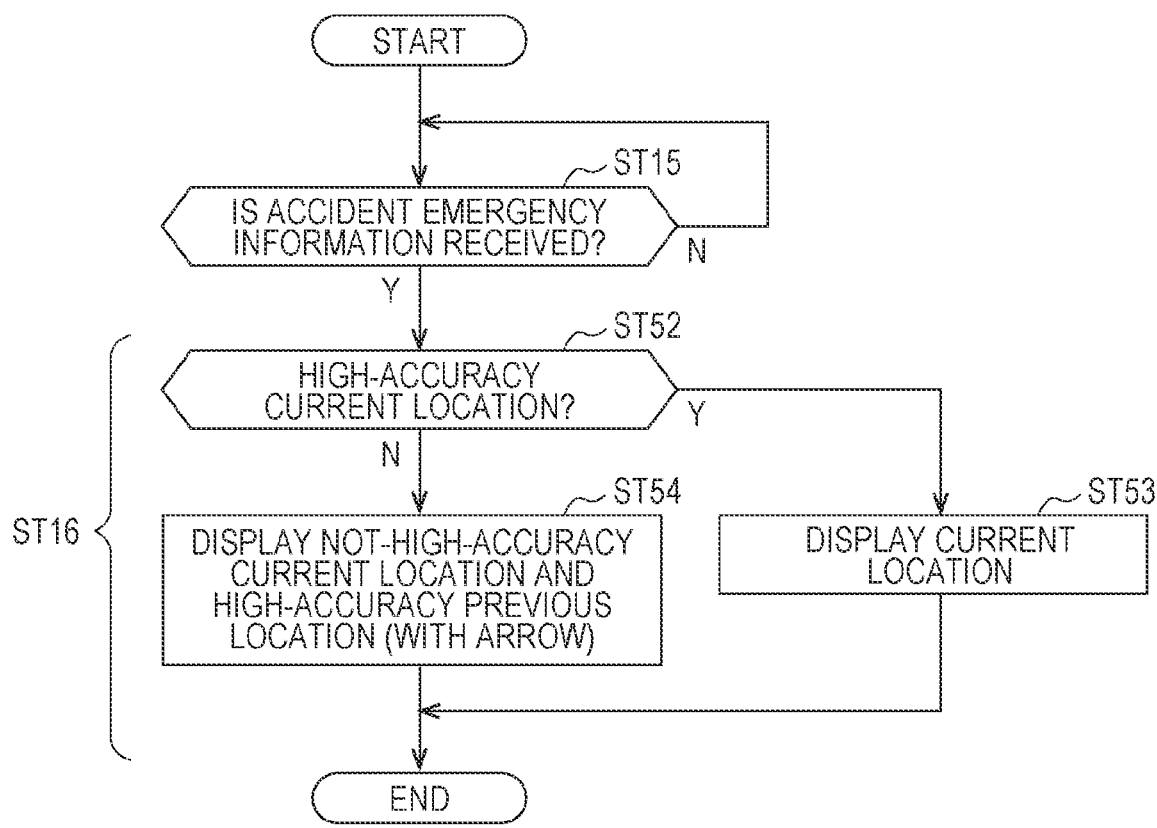
FIG. 8 is a sequence chart illustrating a process flow from when the server apparatus in FIG. 3 receives an emergency report from the automobile involved in the accident to when the emergency report is output and displayed.

FIG. 8 is a sequence chart illustrating a process flow from when the server apparatus 2 in FIG. 3 receives an emergency report from the automobile 10 involved in the accident to when the emergency report is output and displayed.

The server CPU 93 of the server apparatus 2 repeatedly performs the processing in FIG. 8.

In step ST15, the server CPU 93 determines whether the server communication device 91 has received emergency information of an accident from the automobile 10 involved in the accident. If the emergency information of the accident has not been received, the server CPU 93 repeats the processing in step ST15. Upon reception of the emergency information of the accident, the server CPU 93 advances the processing to step ST52.

In step ST52, the server CPU 93 starts the display processing in step ST16 and determines whether the current location and time indicating the accident site included in the received emergency information are high-accuracy location and time generated by the GNSS receiver 56. If the current location and time are highly accurate, the server CPU 93 advances the processing to step ST53. If the current location and time are not highly accurate, that is, if the current location and time are estimated by the automobile 10, the server CPU 93 advances the processing to step ST54. The case in which the current location and time are not highly accurate includes a case in which the emergency information includes previous location and time alone.

Step ST53 is output-and-display processing performed if the current location and time included in the emergency information received by the server apparatus 2 are high-accuracy location and time generated by the GNSS receiver 56. The server CPU 93 outputs the current location and time included in the received emergency information as the location of the accident site and causes the server monitor 95 to display the current location and time.

Step ST54 is output-and-display processing performed if the current location and time included in the emergency information received by the server apparatus 2 are not high-accuracy location and time generated by the GNSS receiver 56. Since the current location and time are not high-accuracy location and time, the server CPU 93 outputs high-accuracy previous location and time included in the received emergency information together with the current location and time that are included in the received emergency information and that are not high-accuracy location and time, and causes the server monitor 95 to display the high-accuracy previous location and time together with the current location and time. Herein, as the previous location and time, the server CPU 93 may select high-accuracy location and time generated by the GNSS receiver 56. Note that if previous location and time are included alone in the emergency information, the server CPU 93 outputs the previous location and time alone included in the emergency information and causes the server monitor 95 to display the previous location and time.

Figure 9A:
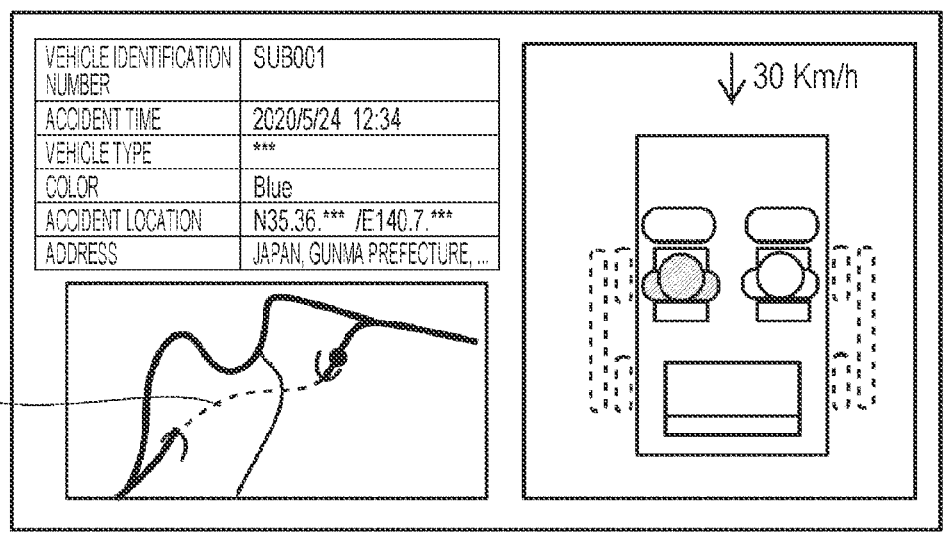
FIGS. 9A to 9C are explanatory diagrams of examples of emergency notification screens for the automobile involved in the accident displayed on a server monitor in FIG. 3.
Figure 9B:
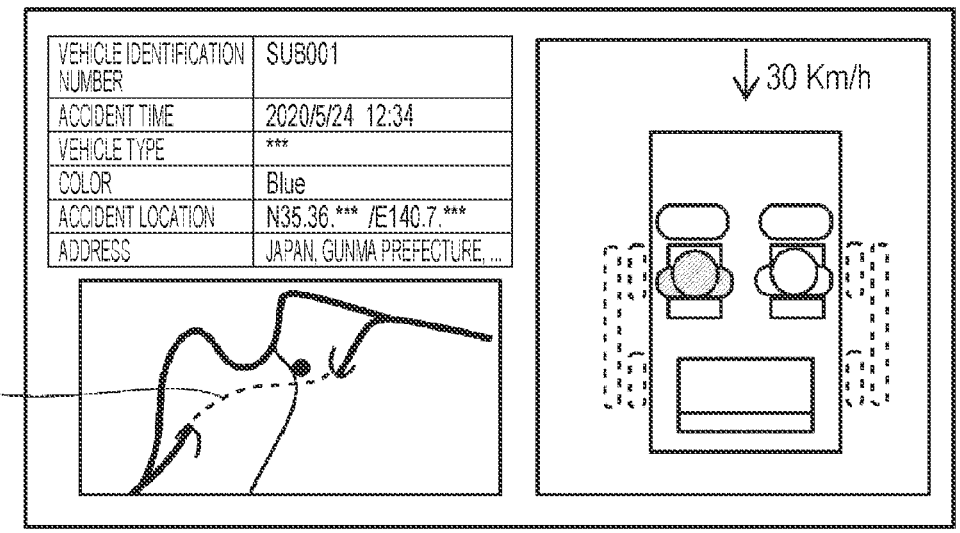
Figure 9C:
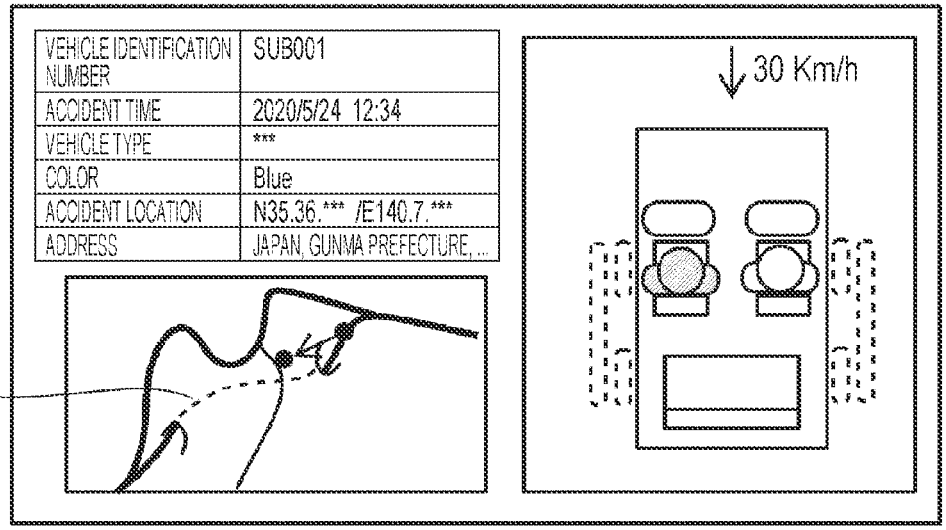

FIGS. 9A to 9C are explanatory diagrams of examples of emergency notification screens for the automobile 10 involved in the accident displayed on the server monitor 95 in FIG. 3.

On the basis of the emergency information received by the server apparatus 2, the server CPU 93 generates any of the emergency notification screens in FIGS. 9A to 9C and causes the server monitor 95 to display the emergency notification screen.

The emergency notification screen in FIG. 9A is displayed if, for example, the emergency information received by the server apparatus 2 includes high-accuracy current location and time.

In a right part of the emergency notification screen, the state of the automobile 10 at the time of the accident, the automobile 10 having transmitted the emergency information, is schematically displayed. As information on the state at the time of the accident, the number of occupants, seat positions of the occupants, details of occupant protection control, and the input part, input direction, and strength of impact are displayed. Herein, two occupants board the automobile 10 on the driver's seat and the passenger seat. For example, each occupant may be displayed in a color in accordance with an individual injury degree estimated by the server apparatus 2. For example, the occupant may be displayed in a darker color as the estimated injury degree is higher. Solid lines indicate that the driver-side front airbag apparatus 83 and the passenger-side front airbag apparatus 85 are deployed. Broken lines indicate that the driver-side curtain airbag apparatus 84 and the passenger-side curtain airbag apparatus 86 are not deployed.

In an upper-left part of the emergency notification screen, a list is displayed including specific attribute information such as a vehicle identification number, a vehicle type, and color of the automobile 10 that has transmitted the emergency information, the accident location indicating the accident site, the address, and the accident time.

In a lower-left part of the emergency notification screen, a map is displayed indicating a topography and road at and around the accident site. Herein, a thick line indicates an old highway passing on a hill, another thick line indicates a new highway passing through a hill tunnel 12, and the thin line indicates a branch road from the old highway on the hill. In addition, the black point on the map indicates the current location included in the emergency information received by the server apparatus 2. Herein, the black point is displayed at an entrance of the hill tunnel 12. Basically, the current location is highly accurate as long as the current location is not within the hill tunnel 12, and the rescue team can be headed toward the entrance of the hill tunnel 12 where the automobile 10 is actually present.

The emergency notification screen in FIG. 9B is for comparative description and is displayed if, for example, the emergency information received by the server apparatus 2 includes not-high-accuracy current location and time alone. In this case, the current location of the automobile 10 in the hill tunnel 12, which may be not highly accurate, is displayed at a position that is slightly deviated from the new highway indicated by the thick line passing through the hill tunnel 12 and is displayed as if being in contact with the branch road from the old highway on the hill indicated by the thin line. On the basis of the display position of the black point, the rescue team mistakenly determines that the automobile 10 that has transmitted the emergency information is on the branch road and rushes to the branch road. However, the automobile 10 that has transmitted the emergency information is actually in the hill tunnel 12 below, and thus, the rescue team is unable to arrive at the site where the automobile 10 that has transmitted the emergency information is present. After being headed to the position of the black point on the branch road, the rescue team searches the surroundings and arrives at the automobile 10 that has transmitted the emergency information.

In contrast, the emergency notification screen in FIG. 9C is displayed if, for example, the emergency information received by the server apparatus 2 includes, together with not high-accuracy current location and time, high-accuracy previous location and time generated by the GNSS receiver 56. The previous location is, for example, the location of the entrance of the hill tunnel 12 as in FIG. 9A. In this case, the current location of the automobile 10 in the hill tunnel 12, which may be not highly accurate, is displayed at a position that is slightly deviated from the new highway indicated by the thick line passing through the hill tunnel 12 and is displayed as if being in contact with the branch road from the old highway on the hill indicated by the thin line. However, unlike in FIG. 9B, on the map in the lower-left part of the emergency notification screen, black points indicate the current location and the previous location. In addition, the arrow is superposed from the black point indicating the previous location toward the black point indicating the current location. If the high-accuracy previous location and time of the automobile 10 involved in the accident are included in the received emergency information, the server CPU 93 can output the high-accuracy previous location to a display in a state where the location is indicated as being previously generated.

By such display, regardless of the current location of the automobile 10 being adjacent to the branch road, an operator at the call center or a member of the rescue team can correctly understand that the automobile 10 involved in the accident has traveled from the previous location to the inside of the tunnel 12 along the arrow and is involved in the accident on a road in the tunnel 12 indicated by the broken line. The operator at the call center or the member of the rescue team can correctly understand that the automobile 10 involved in the accident is actually in the tunnel 12, not on the branch road overlapped with the black point. The rescue team can be headed straightly toward the hill tunnel 12 without being headed toward the branch road for rescue.

Within the tunnel 12, the GNSS receiver 56 of the automobile 10 is incapable of receiving signal waves from the GNSS satellites 110. Thus, the automobile 10 estimates, in the automobile 10, the current location and time at which the automobile 10 is involved in the accident. Each of the emergency notification screens in FIGS. 9B and 9C displays the current location and time obtained by estimation. If the current location is displayed alone on the map as in FIG. 9B, the operator at the call center or the member of the rescue team is likely to misunderstand that the accident site is the branch road that is different from the actual accident site, which is within the tunnel 12. The member of the rescue team initially goes up the hill to the branch road and then search the surroundings in a wide range before arriving at the actual accident site, which is within the tunnel 12.

In contrast, if the actual accident site is the branch road indicated by the thin line on the tunnel 12, the GNSS receiver 56 of the automobile 10 can receive signal waves from the GNSS satellites 110 and generate the high-accuracy current location and time. The emergency notification screen in this case is illustrated in FIG. 9A. The member of the rescue team can go up the hill to the branch road, thereby arriving at the actual accident site without confusion.

Even if, as in the tunnel, woods or the like block the signal waves for the branch road indicated by the thin line on the tunnel 12, as long as the last location history is on the old highway that is ahead of the branch of the old highway from the new highway, the operator at the call center or the member of the rescue team can estimate that the accident site is on the branch road.

Note that the previous location and the arrow may be displayed in the case of FIG. 9A as in FIG. 9C if the previous location and time are received. However, the previous location in this case is likely to be, for example, the branch point between the old highway and the branch road unlike in FIG. 9B. As a result, the position and direction of the arrow from the previous location to the current location are likely to be different from those in FIG. 9C. Without making the same judgment as that for FIG. 9B, the member of the rescue team can go up the hill to the branch road, thereby arriving at the actual accident site without confusion.

As described above, in this embodiment, the high-accuracy location and time that are previously generated by the GNSS receiver 56 that receives signal waves are stored as a log in the detection memory 57 as a storage. When detecting or forecasting a collision of the automobile 10, the occupant protection ECU 30 as a controller determines whether the high-accuracy current location and time are acquirable from the GNSS receiver 56. If the high-accuracy current location and time are not acquirable, the occupant protection ECU 30 collects high-accuracy previous location and time that are previously generated by the GNSS receiver 56 and that are stored in the detection memory 57 and causes the external communication terminal 60 to transmit the high-accuracy previous location and time to the server apparatus 2. Thus, the server apparatus 2 can receive the accurate location and time obtained by the GNSS receiver 56, although the location and time are previous ones, not the current location and time that are not obtained by the GNSS receiver 56 and that may indicate an inaccurate accident site of the automobile 10 involved in the accident. On the basis of the accurate previous location, the rescue team that is dispatched in response to a dispatch request can immediately search for the automobile 10 involved in the accident without confusion and can rush to the accident site of the automobile 10 involved in the accident.

In contrast, for example, if the server apparatus 2 receives the current location and time of the automobile 10 alone estimated on the basis of the high-accuracy previous location and time that are generated by the GNSS receiver 56 for the last time, the rescue team rushes to the current location that is likely to be inaccurate. For example, on the basis of the emergency notification screen in FIG. 9A, they rush to the branch road that is indicted by the thin line and that is different from the actual accident site. Even if the rescue team is headed toward the accident site displayed on the screen, they may be unable to find the automobile 10 and occupant or the like involved in the accident. Subsequently, the rescue team searches the surroundings of the location they rushed to. For example, if the searching direction is wrong and is a direction different from the actual accident site, or if the topography or road around the location they rushed to is complex, the rescue team may be unable to find a way and, even if the search is started, they may be unable to immediately find the automobile 10 and occupant or the like involved in the accident. If the search for the accident site is started in a state where the direction of the actual accident site is not known in the above manner, it may take a long time for the rescue team to search a wide area before arriving at the accident site. In this case, the rescue is greatly delayed.

In this embodiment, since the accurate previous location of the automobile 10 involved in the accident is obtained, on the basis of the accurate previous location, for example, the rescue team can search the road of the location. Thus, by unicursal traveling, as in the case where the rescue team rushes to the current location, they are expected to arrive at the accident site where the automobile 10 is actually involved in the accident without taking a long time. The time for the rescue team to arrive at the actual accident site is unlikely to be long unlike in a case of search in a wide area.

In this embodiment, if the acquired current location and time of the automobile 10 are estimated by an estimator, the high-accuracy previous location and time generated by the GNSS receiver 56 and stored in the storage are collected, and both the current location and time and the previous location and time are transmitted from the transmitter to the server apparatus 2. Thus, the server apparatus 2, the operator at the call center where the server apparatus 2 is installed, and the rescue team that is dispatched in response to a dispatch request can use both the accurate previous location and the estimated current location of the automobile 10 involved in the accident.

The above-described embodiment is an example of an embodiment of the disclosure, and the disclosure is not limited thereto. Various modifications or changes may be made without departing from the gist of the disclosure.

In the embodiment described above, the plurality of ECUs are present in a separated manner in the automobile 10, but some or all of the ECUs may be integrated into one ECU.

In the disclosure, a location previously generated by a GNSS receiver that receives signal waves is stored in a storage. When detecting or forecasting a collision of a vehicle, a controller determines whether a current location is acquirable from the GNSS receiver. If the current location is not acquirable, the controller collects a previous location stored in a storage and causes the transmitter to transmit the previous location to a server apparatus. Thus, the server apparatus can receive the accurate location obtained by the GNSS receiver, although the location is a previous one, not the current location that is not obtained by the GNSS receiver and that may indicate an inaccurate accident site of the vehicle involved in the accident. On the basis of the accurate previous location, the rescue team that is dispatched in response to a dispatch request can immediately search for the vehicle involved in the accident without confusion and can rush to the accident site of the vehicle involved in the accident.

In contrast, for example, if the server apparatus receives the current location of the vehicle alone estimated on the basis of the previous location generated by the GNSS receiver, the rescue team rushes to the current location that is likely to be inaccurate. Even if the rescue team is headed toward the accident site indicated by information, they may be unable to find the vehicle and occupant or the like involved in the accident. Subsequently, the rescue team searches the surroundings of the location they rushed to. For example, if the searching direction is wrong and is a direction different from the actual accident site, or if the topography or road around the location they rushed to is complex, the rescue team may be unable to find a way and, even if the search is started, they may be unable to immediately find the vehicle and occupant or the like involved in the accident. If the search for the accident site is started in a state where the direction is not known in the above manner, it may take a long time for the rescue team to search a wide area before arriving at the accident site. In this case, the rescue is greatly delayed. In this embodiment, since the accurate previous location of the vehicle involved in the accident is obtained, on the basis of the accurate previous location, for example, the rescue team can search the road of the location. Thus, the rescue team is expected to arrive at the accident site where the vehicle is actually involved in the accident without taking a long time. The time for the rescue team to arrive at the actual accident site is unlikely to be long unlike in a case of search in a wide area.

The occupant protection ECU 30 and the external communication ECU 27 in the control system 20 of the automobile 10 and the server CPU 93 of the server apparatus 2 illustrated in FIGS. 2 and 3 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the occupant protection ECU 30 and the external communication ECU 27 in the control system 20 of the automobile 10 and the server CPU 93 of the server apparatus 2. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIGS. 2 and 3.

The invention claimed is:

1. A vehicle with an automatic report function, the vehicle comprising:
  a transmitter configured to transmit, to a server apparatus for requesting emergency dispatch, emergency information of the vehicle when a collision of the vehicle is detected or forecasted;
  a global navigation satellite system (GNSS) receiver configured to receive signal waves and generate a location of the vehicle based on the received signal waves;
  a storage configured to store, as a previous location, the location of the vehicle generated by the GNSS receiver; and
  a controller configured to:
    when the collision of the vehicle is detected or forecasted, determine whether the GNSS receiver is able or unable to acquire a current location of the vehicle;
    based on determining that the GNSS receiver is able to acquire the current location of the vehicle when the collision of the vehicle is detected or forecasted, i) control the GNSS receiver to acquire the current location of the vehicle and ii) control the transmitter to transmit, as part of the emergency information, the current location of the vehicle acquired from the GNSS receiver; and
    based on determining that the GNSS receiver is unable to acquire the current location of the vehicle when the collision of the vehicle is detected or forecasted, i) retrieve the previous location of the vehicle stored in the storage, ii) obtain a traveling direction and a traveling amount of the vehicle using sensors, other than the GNSS receiver, mounted on the vehicle, and iii) control the transmitted to transmit, as part of the emergency information, the retrieved previous location of the vehicle and the obtained traveling direction and traveling amount of the vehicle.

2. The vehicle according to claim 1, further comprising:
  an estimator configured to estimate the current location of the vehicle on a basis of the previous location generated by the GNSS receiver,
  wherein, when the collision of the vehicle is detected or forecasted, the controller is configured to retrieve the previous location generated by the GNSS receiver and stored in the storage preferentially over the current location of the vehicle estimated by the estimator and cause the transmitter to transmit the previous location to the server apparatus.

3. The vehicle according to claim 2,
  wherein, when the current location of the vehicle estimated by the estimator is acquired, the controller is configured to retrieve the previous location stored in the storage and cause the transmitter to transmit both the previous location and the current location to the server apparatus.

4. The vehicle according to claim 3,
  wherein the storage is configured to store as a log, together with a plurality of previous locations generated by the GNSS receiver, an accuracy of each of the previous locations, and
  wherein the controller is configured to select and retrieve a most recent previous location that satisfies a predetermined location accuracy from among the plurality of previous locations stored in the storage.

5. The vehicle according to claim 2,
wherein the storage is configured to store as a log, together with a plurality of previous locations generated by the GNSS receiver, an accuracy of each of the previous locations, and
wherein the controller is configured to select and retrieve a most recent previous location that satisfies a predetermined location accuracy from among the plurality of previous locations stored in the storage.

6. The vehicle according to claim 1,
wherein the storage is configured to store as a log, together with a plurality of previous locations generated by the GNSS receiver, an accuracy of each of the previous locations, and
wherein the controller is configured to select and retrieve a most recent previous location that satisfies a predetermined location accuracy from among the plurality of previous locations stored in the storage.

7. A vehicle with an automatic report function, the vehicle comprising:
  a transmitter configured to transmit, to a server apparatus for requesting emergency dispatch, emergency information of the vehicle when a collision of the vehicle is detected or forecasted;
  a global navigation satellite system (GNSS) receiver configured to receive signal waves and generate a location of the vehicle based on the received signal waves;
  a storage configured to store, as a previous location, the location of the vehicle generated by the GNSS receiver; and
  circuitry configured to:
    when the collision of the vehicle is detected or forecasted, determine whether the GNSS receiver is able or unable to acquire a current location of the vehicle;
    based on determining that the GNSS receiver is able to acquire the current location of the vehicle when the collision of the vehicle is detected or forecasted, i) control the GNSS receiver to acquire the current location of the vehicle and ii) control the transmitter to transmit, as part of the emergency information, the current location of the vehicle acquired from the GNSS receiver; and
    based on determining that the GNSS receiver is unable to acquire the current location of the vehicle when the collision of the vehicle is detected or forecasted, i) retrieve the previous location of the vehicle stored in the storage, ii) obtain a traveling direction and a traveling amount of the vehicle using sensors, other than the GNSS receiver, mounted on the vehicle, and iii) control the transmitted to transmit, as part of the emergency information, the retrieved previous location of the vehicle and the obtained traveling direction and traveling amount of the vehicle.

* * * * *